Jan. 14, 1930.  J. MOFFATT  1,743,899
DOCUMENT CONTAINER
Filed July 26, 1927

INVENTOR
James Moffatt
BY
H. G. Manning
ATTORNEY

Patented Jan. 14, 1930

1,743,899

UNITED STATES PATENT OFFICE

JAMES MOFFATT, OF WATERBURY, CONNECTICUT

DOCUMENT CONTAINER

Application filed July 26, 1927. Serial No. 208,533.

This invention relates to document containers, and more particularly to a receptacle for an automobile license certificate which will protect it from moisture and dirt.

One object of the present invention is to provide a document container of the above nature which is adapted to be quickly accessible at all times so as to enable the driver to produce the license certificate whenever required.

A further object of the invention is to provide a device of the above nature which will be simple in construction, inexpensive to manufacture, easy to install and manipulate, compact, ornamental in appearance, and very efficient and durable in use.

With these and other objects in view there have been illustrated on the accompanying drawings two forms in which the invention may be conveniently embodied in practice.

Figure 1:
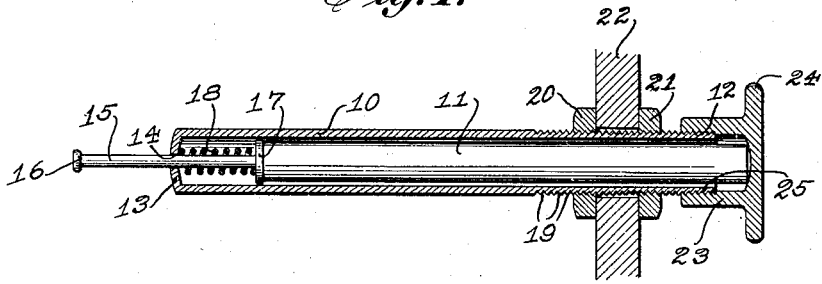
Fig. 1 represents a longitudinal sectional view of the first form of the invention as it appears when installed upon the instrument board of a motor vehicle.
Figure 2:
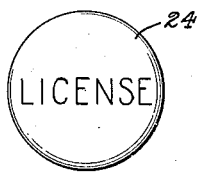
Fig. 2 is an end view of the detachable cap for the license container.

In many States, the owner of a motor vehicle is required by statute to carry his registration certificate in the vehicle so that it can be produced whenever requested by an officer having authority. Ordinarily such certificates are kept loose and unprotected, either in the side pocket of the car or under a seat, where they are apt to be injured by contact with tools or other articles, or even become lost.

By means of the present invention, the above and other disadvantages have been avoided by providing a certificate container adapted to be permanently located on the instrument board or other part of the car so as to be readily accessible at all times.

Referring now to the drawings in which like reference numerals denote corresponding parts throughout the several views, the numeral 10 indicates a hollow tube of a size suited to contain a license certificate or other document 11, the latter being rolled into spiral shape and adapted to be inserted through the open end 12 of said tube. The tube 10 has a closed end 13, and said closed end 13 is provided with an aperture 14, in which a rearwardly extending rod 15 is loosely and slidably fitted. The rod 15 has an enlarged stop member 16 on its outer end, and said rod is provided on its inner end with a plunger 17 adapted to be pressed toward the open end 12 of the tube 10 by a light helical spring 18 seated upon the closed end 13 of said tube.

The forward part of the tube 10 is provided with exterior threads 19 upon which a pair of nuts 20 and 21 are screwed, said nuts being adapted to engage tightly against the opposite sides of the instrument board 22, whereby the hollow tube 10 will be held in horizontal position with its open end 12 extending through said instrument board 22.

The open end 12 of the tube is adapted to be closed by a detachable cap member 23 having an enlarged knurled manipulating flange 24 and being provided with an interiorly threaded section 25 whereby it may be screwed upon the open end 12 of said tube 10.

In operation, when it is desired to remove the license certificate from the tube 10, it will only be necessary to unscrew the detachable cap 23 and remove it, whereupon the spring-pressed plunger 17 will force the certificate 11 out of the open end 12 into a position to be conveniently grasped by the driver.

Figure 3:
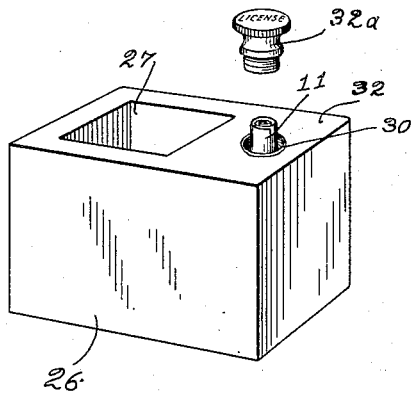
Fig. 3 is a perspective view of a modified form of the invention.
Figure 4:
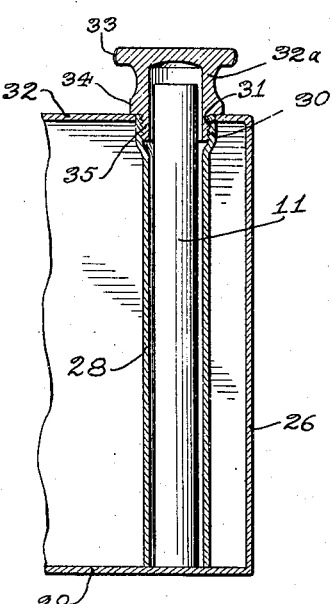
Fig. 4 is a fragmentary sectional view of the same.

In the modified form of the invention shown in Figs. 3 and 4, the certificate container is formed as a part of a box-shaped smoker's receptacle 26, said receptacle 26 having a rectangular recess 27 for receiving a package of cigarettes and/or a match box. The rolled up certificate 11, in this instance, is carried vertically within a hollow tubular member 28, the lower end of which rests upon the bottom 29 of the smoker's receptacle 26. The upper end of the tubular member 28 is expanded slightly at 30 and is seated in an aperture 31 in the upper face 32 of the receptacle 26.

The certificate 11 is adapted to extend a short distance above the upper expanded end 30 of the tubular member 28, whereby it may be readily grasped by the driver whenever the detachable cap 32ᵃ is removed. The cap 32ᵃ is provided on its upper end with a flanged rim 33 and intermediate its ends has an enlarged shouldered section 34 adapted to seat upon the top 32 of the receptacle 26. Below the shouldered section 34, the cap 32ᵃ is provided with a depending exteriorly threaded skirt portion 35 adapted to be screwed into the interiorly threaded expanded section 30 of the tube 28.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a document container to be carried on a motor vehicle, a tube closed at one end adapted to be mounted in the instrument board of said vehicle, the open end of said tube extending through said board and having a detachable cap for hermetically sealing said tube, and a spring-pressed plunger in the closed end of said tube for pushing the document out the open end of said tube into position to be conveniently grasped by the driver when said cap is detached, and a guiding rod on said plunger extending through said closed end.

2. In a document container to be carried on a motor vehicle, a tube closed at one end adapted to be mounted in the instrument board of said vehicle, the open end of said tube extending through said board and having a detachable threaded cap for hermetically sealing said tube screwed thereon, said tube having a spring-pressed plunger at its closed end, and a guiding rod on said plunger extending through said closed end.

3. In a document container to be carried on a motor vehicle, a tube closed at one end adapted to be mounted in the instrument board of said vehicle, the open end of said tube extending through said board and having a flanged detachable cap for hermetically sealing said tube, said tube having a spring-pressed plunger at its closed end, and a guiding rod on said plunger extending through said closed end.

4. In a container for a certificate of registration to be carried on a motor vehicle, a tube closed at one end and extending through the instrument board of said vehicle, the exterior of said tube being threaded where it passes through said board, locking nuts screwed on said tube for tightly engaging opposite sides of said board, and a detachable cap for hermetically sealing the closed end of said tube, said tube having a spring-pressed plunger at its closed end, and a guiding rod on said plunger extending through said closed end.

5. In a document container to be carried on a motor vehicle, a tube closed at one end adapted to be mounted in the instrument board of said vehicle, the open end of said tube extending forwardly through said board and having a detachable cap for hermetically sealing said tube, means in the closed end of said tube for pressing the document toward the open end thereof so that it will be in position to be conveniently grasped by the driver when said cap is removed and means extending rearwardly from said document-pressing means for guiding it.

In testimony whereof, I have affixed my signature to this specification.

JAMES MOFFATT.